United States Patent
El Assaad et al.

(10) Patent No.: US 12,095,699 B2
(45) Date of Patent: Sep. 17, 2024

(54) APPARATUSES, METHODS AND COMPUTER PROGRAMS FOR A FIRST AND A SECOND MOBILE TRANSCEIVER TO OBTAIN A PHYSICAL DATA CHANNEL CONFIGURATION FOR DIRECT COMMUNICATION

(71) Applicant: VOLKSWAGEN AKTIENGESELLSCHAFT, Wolfsburg (DE)

(72) Inventors: Ahmad El Assaad, Wolfsburg (DE); Steffen Schmitz, Wesel (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 627 days.

(21) Appl. No.: 17/048,404

(22) PCT Filed: Apr. 12, 2019

(86) PCT No.: PCT/EP2019/059573
§ 371 (c)(1),
(2) Date: Oct. 16, 2020

(87) PCT Pub. No.: WO2019/201817
PCT Pub. Date: Oct. 24, 2019

(65) Prior Publication Data
US 2021/0152313 A1 May 20, 2021

(30) Foreign Application Priority Data
Apr. 16, 2018 (EP) .................................. 18167582

(51) Int. Cl.
*H04L 5/00* (2006.01)
*H04W 72/0453* (2023.01)

(52) U.S. Cl.
CPC .......... *H04L 5/0053* (2013.01); *H04L 5/0007* (2013.01); *H04L 5/0094* (2013.01); *H04W 72/0453* (2013.01)

(58) Field of Classification Search
CPC ............. H04W 72/0453; H04L 5/0044; H04L 5/0094; H04L 5/0053; H04L 5/0007; H04L 5/0023; H04L 5/0042
See application file for complete search history.

(56) References Cited

U.S. PATENT DOCUMENTS

2012/0093098 A1* 4/2012 Charbit ................. H04W 72/04
370/329
2014/0044024 A1 2/2014 Zou et al.
(Continued)

FOREIGN PATENT DOCUMENTS

EP         1689095 A2    8/2006
WO    2016181094 A1    11/2016
(Continued)

OTHER PUBLICATIONS

Sony; 3GPP TSG RAN WG1 Meeting #89; R1-1708264; May 2017; Hangzhou, China.
(Continued)

*Primary Examiner* — Oussama Roudani
(74) *Attorney, Agent, or Firm* — Barnes & Thornburg LLP

(57) ABSTRACT

Apparatuses, methods and computer programs for a first and a second mobile transceiver to obtain a physical data channel configuration for direct communication. An apparatus for a first mobile transceiver of a mobile communication system includes one or more interfaces to communicate with a second mobile transceiver of the mobile communication system and a control module to control the one or more interfaces. The control module estimates a radio channel between the first mobile transceiver and the second mobile (Continued)

transceiver, establishes a control channel between the first mobile transceiver and the second mobile transceiver, determines a physical layer data channel configuration for data communication between the first mobile transceiver and the second mobile transceiver, and provides the information on the physical data channel configuration to the second mobile transceiver using the control channel.

21 Claims, 3 Drawing Sheets

(56) References Cited

U.S. PATENT DOCUMENTS

| | | | |
|---|---|---|---|
| 2014/0192736 | A1 | 7/2014 | Jeong et al. |
| 2017/0005775 | A1* | 1/2017 | Cheng .................. H04W 72/23 |
| 2018/0048446 | A1 | 2/2018 | Jiang et al. |
| 2018/0049220 | A1 | 2/2018 | Patil et al. |
| 2018/0234220 | A1* | 8/2018 | Yasukawa ............. H04W 72/04 |
| 2018/0368119 | A1* | 12/2018 | Rakotoharison ...... H04W 72/23 |
| 2019/0239197 | A1* | 8/2019 | Rakotoharison ...... H04W 76/14 |
| 2019/0261358 | A1* | 8/2019 | Tang ................... H04W 72/044 |
| 2019/0281605 | A1* | 9/2019 | Fu ..................... H04W 72/0453 |
| 2020/0021467 | A1* | 1/2020 | Nammi ................ H04B 7/0413 |
| 2020/0280966 | A1* | 9/2020 | Baldemair ............ H04W 72/23 |

FOREIGN PATENT DOCUMENTS

| | | |
|---|---|---|
| WO | 2017171437 A1 | 10/2017 |
| WO | 2018030775 A1 | 2/2018 |

OTHER PUBLICATIONS

Office Action; Chinese Patent Application No. 201980026423.1; Nov. 3, 2022.
Office Action; Korean Patent Application No. 10-2020-7032962; Oct. 25, 2022.
Written Opinion; Korean Patent Application No. 10-2020-7032962; Dec. 5, 2022.
Search Report for European Patent Application No. 18167582.8; Oct. 15, 2018.
Search Report for International Patent Application No. PCT/EP2019/059573; Jul. 12, 2019.
Huawei; 3GPP TSG RAN WG1 Meeting #90; R1-1712135; Aug. 2017; Prague, Czech Republic.
Vodafone; 3GPP TSG RAN #79; RP-180426; Mar. 2018; Chennai, India.
Office Action; Korean Patent Application No. 10-2020-7032962; Apr. 26, 2023.

* cited by examiner form a physical layer data channel configuration for direct communication with another transceiver without the need for involvement of a base station or a comparable entity of the mobile communication system. Instead, a concept using peer-to-peer information exchange and/or autonomous decision making at a transceiver can be enabled.

APPARATUSES, METHODS AND COMPUTER PROGRAMS FOR A FIRST AND A SECOND MOBILE TRANSCEIVER TO OBTAIN A PHYSICAL DATA CHANNEL CONFIGURATION FOR DIRECT COMMUNICATION

PRIORITY CLAIM

This patent application is a U.S. National Phase of International Patent Application No. PCT/EP2019/059573, filed 12 Apr. 2019, which claims priority to European Patent Application No. 18167582.8, filed 16 Apr. 2018, the disclosures of which are incorporated herein by reference in their entireties.

SUMMARY

Illustrative embodiments relate to apparatuses, methods and computer programs for a first and a second mobile transceiver to obtain a physical data channel configuration for direct communication, more particularly, but not exclusively, to a concept for adapting a physical layer configuration for wireless direct communication.

BRIEF DESCRIPTION OF THE DRAWINGS

Disclosed embodiments will be described by way of example only, and with reference to the accompanying figures, in which.

DETAILED DESCRIPTION

Figure 1:
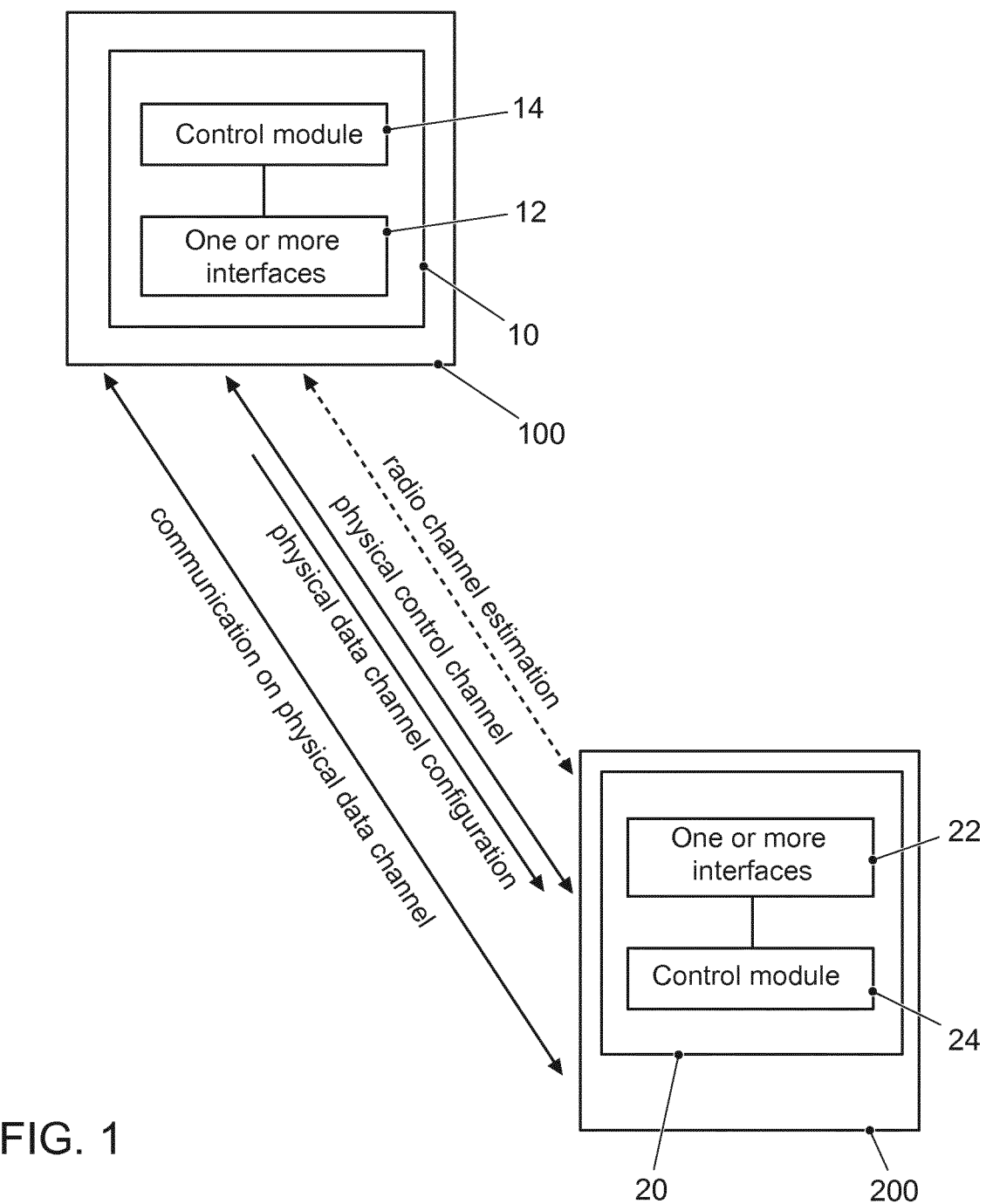
FIG. 1 illustrates an exemplary embodiment of an apparatus for a first mobile transceiver, an exemplary embodiment of a second mobile transceiver and an exemplary embodiment of a mobile communication system.

A development of wireless communications has been the introduction of direct communication between mobile transceivers. Such direct communication enables transmission and reception of wireless signals between mobile devices directly without the need to transmit signals to a base station of a mobile communication system, and to the forward the information from the base station to the destination. For example, the third Generation Partnership Project (3GPP) specified certain mechanisms for direct communication between mobile transceivers, also referred to as Device-to-Device (D2D) communication. 3GPP also defined such mechanisms for inter-vehicular communication, which is also referred to as Vehicle-to-Vehicle (V2V) communication.

Document WO 2018/030775 A1 describes a mobile communication system using D2D, wherein the direct radio link between mobile transceivers is referred to as sidelink. Higher layer control signaling, i.e., Radio Resource Control (RRC), is used to configure Semi-Persistent Scheduling (SPS) for a user device. Document WO 2017/171437 A1 also describes a concept for D2D using SPS configurations for different mobile transceivers with different periodicities. Document US 2018/0049220 A1 discloses a concept for using sidelink control information comprising scheduling assignments and priority information. Document WO 2016/181094 discloses resource pool configuration for D2D by a base station. The resources may include resources for a sidelink control channel.

Document US2014/0044024 A1 describes a concept for controlling direct user equipment communications. A method includes receiving reports from first user equipment (UE) and second UE at a serving base station. The base station can then determine at least one control channel and at least one data channel for a direct communication between the first UE and the second UE. A configuration message is transmitted to the first UE and to the second UE to allocate at least one resource block for the direct communication. Document US 2018/0048446 A1 relates to a design for demodulation and reference symbols that may be used for vehicular communication.

Direct automated or autonomous driving is a field of research and development. One concept of dealing with high traffic loads is platooning, in which transportation vehicles are grouped, and which may allow making more efficient use of the road capacity. Groups of transportation vehicles, also referred to as convoys or platoons, may be used to operate the transportation vehicles in the group with a short distance or headway between the transportation vehicles, as the transportation vehicles within the group may react within a short time delay or (almost) simultaneously. This can be achieved by control mechanisms being active between the transportation vehicles of the group using direct communication, optionally at low latency.

Disclosed embodiments provide an improved concept for direct communication and an improved concept for direct communication between mobile transceivers.

Disclosed embodiments are based on the finding that schedulers of resources for direct communication between mobile transceivers might not meet the requirements of automotive networking functions. It is a finding of disclosed embodiments that a physical layer configuration can be adapted, e.g., to load situations, radio channels, applications, etc. Moreover, a scheduler can be based on predicted parameters or situations in addition or alternatively to using opportunistic or deterministic scheduling parameters. It is a further finding that information available in certain situations or environment, such as in a platooning scenario, can be used for predictions based on which more efficient scheduling decisions, physical channel configurations and resource assignments can be enabled.

Disclosed embodiments provide an apparatus for a first mobile transceiver of a mobile communication system. The apparatus comprises one or more interfaces configured to communicate with a second mobile transceiver of the mobile communication system. The apparatus further comprises a control module configured to control the one or more interfaces. The control module is configured to estimate a radio channel between the first mobile transceiver and the second mobile transceiver, and to establish a control channel between the first mobile transceiver and the second mobile transceiver based on a predetermined control channel configuration and based on the estimated radio channel. The control module is further configured to determine a physical layer data channel configuration for data communication between the first mobile transceiver and the second mobile transceiver based on the estimated radio channel. The control module is further configured to provide the information on the physical data channel configuration to the second mobile transceiver using the control channel. Disclosed embodiments therewith enable a mobile transceiver to determine an adaptive physical data channel configuration for direct communication between two mobile transceivers.

Disclosed embodiments also provide an apparatus for the second mobile transceiver of the mobile communication system. The apparatus comprises one or more interfaces configured to communicate with the first mobile transceiver of the mobile communication system. The apparatus further comprises a control module configured to control the one or more interfaces.

The control module is further configured to estimate a radio channel between the first mobile transceiver and the second mobile transceiver, and to establish a control channel between the first mobile transceiver and the second mobile transceiver based on the predetermined control channel configuration and based on the estimated radio channel. The control module is further configured to receive information on a physical layer data channel configuration for data communication between the first mobile transceiver and the second mobile transceiver from the first mobile transceiver using the control channel. The control module is further configured to communicate data with the first mobile transceiver based on the information on the physical data channel configuration. Disclosed embodiments therewith enable a mobile transceiver to be dynamically configured with a physical data channel configuration for direct communication between two mobile transceivers.

In further disclosed embodiments the physical layer data channel configuration may comprise one or more elements of the group of a time division duplex scheme, a frequency division duplex scheme, a code division duplex scheme, a spatial division duplex scheme, and an orthogonal frequency division multiplexing scheme. Disclosed embodiments enable an adaptation of a duplex scheme in D2D, for example, based on a radio channel condition, a load situation, or other parameters as will be detailed subsequently. For example, the physical layer data channel configuration may comprise at least an orthogonal frequency division multiplexing component. Disclosed embodiments may hence enable an efficient multiplexing scheme. The physical layer data channel configuration may comprise information on a subcarrier bandwidth configuration for the orthogonal frequency division multiplexing component. Efficient communication may result from adapting a subcarrier bandwidth based on certain conditions. Disclosed embodiments may also consider or adapt further corresponding parameters, such as symbol duration, cyclic prefix duration, time transmission interval length, subcarrier spacing, etc. At least in some disclosed embodiments the physical layer data channel configuration comprises information on a numerology defined for the mobile communication system. Disclosed embodiments may hence enable physical data channel adaptation based on 3GPP or 5G (Fifth Generation mobile communication system) specifications.

In some disclosed embodiments the control module of the first mobile transceiver may be configured to determine the physical layer data channel configuration further based on one or more elements of the group of quality of service requirements of an application for which data is to be communicated with the second mobile transceiver, information on a predicted route of the first and/or second mobile transceiver, information on a predicted radio environment for the first and/or second mobile transceiver, and information on a predicted direct communication activity. Disclosed embodiments may enable a more efficient communication by using predicted information when determining physical channel configurations or scheduling decisions. In disclosed embodiments the information on the physical data channel configuration may comprise information on frequency and time resources to be used for the data communication. Disclosed embodiments may enable dynamic resource assignment based on the physical data channel configuration in D2D/V2V, for example. In further disclosed embodiments the control module may be configured to receive information on the predetermined control channel configuration from a base station transceiver or a mobile transceiver of the mobile communication system. Disclosed embodiments may use a preconfigured control channel, which may be semi-statically adapted by system or network control.

Disclosed embodiments also provide a method for a first mobile transceiver of a mobile communication system. The method comprises estimating a radio channel between the first mobile transceiver and the second mobile transceiver, and establishing a control channel between the first mobile transceiver and the second mobile transceiver based on a predetermined control channel configuration and based on the estimated radio channel. The method further comprises determining a physical layer data channel configuration for data communication between the first mobile transceiver and the second mobile transceiver and based on the estimated radio channel, and providing the information on the physical data channel configuration to the second mobile transceiver using the control channel.

Disclosed embodiments further provide a method for a second mobile transceiver of a mobile communication system. The method comprises estimating a radio channel between the first mobile transceiver and the second mobile transceiver, and establishing a control channel between the first mobile transceiver and the second mobile transceiver based on a predetermined control channel configuration and based on the estimated radio channel. The method further comprises receiving information a physical layer data channel configuration for data communication between the first mobile transceiver and the second mobile transceiver from the first mobile transceiver using the control channel. The method further comprises communicating data with the first mobile transceiver based on the information on the physical data channel configuration.

Disclosed embodiments further provide a computer program having a program code for performing one or more of the above described methods, when the computer program is executed on a computer, processor, or programmable hardware component. A further disclosed embodiment is a computer readable storage medium storing instructions which, when executed by a computer, processor, or programmable hardware component, cause the computer to implement one of the methods described herein.

Further disclosed embodiments are a mobile transceiver comprising an exemplary embodiment of at least one of the above apparatuses, a transportation vehicle comprising an exemplary embodiment of at least one of the above apparatuses, a transportation vehicle comprising an exemplary embodiment of at least one of the first or the second mobile transceiver, and a mobile communication system comprising the first and second mobile transceivers as detailed above.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular exemplary embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 illustrates an apparatus 10 for a first mobile transceiver 100 of a mobile communication system 300. The apparatus 10 comprises one or more interfaces 12, which are configured to communicate with a second mobile transceiver 200 of the mobile communication system 300. The apparatus 10 further comprises a control module 14, which is coupled to the one or more interfaces 12. The control module 14 is configured to control the one or more interfaces 12. The control module 14 is further configured to estimate a radio channel between the first mobile transceiver 100 and the second mobile transceiver 200, and to establish a control channel between the first mobile transceiver 100 and the second mobile transceiver 200 based on a predetermined control channel configuration and based on the estimated radio channel. The control module 14 is further configured to determine a physical layer data channel configuration for data communication between the first mobile transceiver 100 and the second mobile transceiver 200 based on the estimated radio channel, and to provide the information on the physical data channel configuration to the second mobile transceiver 200 using the control channel.

FIG. 1 also illustrates an apparatus 20 for a second mobile transceiver 200 of a mobile communication system 300. The apparatus 20 comprises one or more interfaces 22 configured to communicate with the first mobile transceiver 100 of the mobile communication system 300. The apparatus 20 further comprises a control module 24 configured to control the one or more interfaces 22. The control module 24 is coupled to the one or more interfaces 22. The control module 24 is further configured to estimate a radio channel between the first mobile transceiver 100 and the second mobile transceiver 200, and to establish a control channel between the first mobile transceiver 100 and the second mobile transceiver 200 based on a predetermined control channel configuration and based on the estimated radio channel. The control module 24 is further configured to receive information a physical layer data channel configuration for data communication between the first mobile transceiver 100 and the second mobile transceiver 200 from the first mobile transceiver 100 using the control channel, and to communicate data with the first mobile transceiver 100 based on the information on the physical data channel configuration.

FIG. 1 further illustrates an exemplary embodiment of a first mobile transceiver 100 comprising an exemplary embodiment of the apparatus 10. An exemplary embodiment of a second mobile transceiver 200 comprising an exemplary embodiment of the apparatus 20 is also illustrated in FIG. 1. Both mobile transceivers 100, 200 or apparatuses 10, 20 may be part of an exemplary embodiment of a mobile communication system 300 as also shown in FIG. 1. A further disclosed embodiment is a transportation vehicle comprising a mobile transceiver 100, 200 or an apparatus 10, 20.

In disclosed embodiments the one or more interfaces 12, 22, may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 12, 22 may comprise further components to enable according communication in the mobile communication system 300, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 12, 22 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 12, 22 may serve the purpose of transmitting or receiving or both, transmitting and receiving, information, such as information related to capabilities, application requirements, message interface configurations, feedback, information related to control commands etc.

As shown in FIG. 1 the respective one or more interfaces 12, 22 are coupled to the respective control modules 14, 24 at the apparatuses 10, 20. In disclosed embodiments the control modules 14, 24 may be implemented using one or more processing units, one or more processing devices, any method or mechanism for processing, such as a processor, a computer or a programmable hardware component being operable with accordingly adapted software. In other words, the described functions of the control modules 14, 24 may as well be implemented in software, which is then executed on one or more programmable hardware components. Such hardware components may comprise a general purpose processor, a Digital Signal Processor (DSP), a micro-controller, etc.

FIG. 1 also shows an exemplary embodiment of a system 300 comprising disclosed embodiments of the first and second mobile transceivers 100, 200, the apparatuses 10, 20, respectively. In disclosed embodiments, communication, i.e., transmission, reception or both, make take place among mobile transceivers 100, 200 directly and/or between mobile transceivers 100, 200 and a network infrastructure component. Such communication may make use of a mobile communication system 300. In other words such communication may be carried out directly, e.g., by Device-to-Device (D2D) communication, which may also comprise Vehicle-to-Vehicle (V2V) communication in case the mobile transceivers 100, 200 are implemented in transportation vehicles as will be detailed subsequently. Such communication may be carried out using the specifications of a mobile communication system 300.

The mobile communication system 300 may, for example, correspond to one of the Third Generation Partnership Project (3GPP)-standardized mobile communication networks, where the term mobile communication system is used synonymously to mobile communication network. The mobile or wireless communication system may correspond to a mobile communication system of the 5th Generation (5G) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

A base station transceiver can be operable or configured to communicate with one or more active mobile transceivers 100, 200 and a base station transceiver can be located in or adjacent to a coverage area of another base station transceiver, e.g., a macro cell base station transceiver or small cell base station transceiver. Hence, disclosed embodiments may provide a mobile communication system 300 comprising two or more mobile transceivers 100, 200 and one or more base station transceivers, wherein the base station transceivers may establish macro cells or small cells, as e.g., pico-, metro-, or femto cells. A mobile transceiver may correspond to a smartphone, a cell phone, user equipment, a laptop, a notebook, a personal computer, a Personal Digital Assistant (PDA), a Universal Serial Bus (USB)-stick, a car, a vehicle etc. A mobile transceiver may also be referred to as User Equipment (UE) or mobile in line with the 3GPP terminology. A transportation vehicle may correspond to any conceivable method or mechanism for transportation, e.g., a car, a bike, a motorbike, a van, a truck, a bus, a ship, a boat, a plane, a train, a tram, etc.

A base station transceiver can be located in the fixed or stationary part of the network or system. A base station transceiver may correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a relay station, a transmission point etc., which may be further subdivided in a remote unit and a central unit.

A mobile transceiver 100, 200 can be associated with a base station transceiver or cell. The term cell refers to a coverage area of radio services provided by a base station transceiver, e.g., a NodeB (NB), an eNodeB (eNB), a remote radio head, a transmission point, etc. A base station transceiver may operate one or more cells on one or more frequency layers, in some disclosed embodiments a cell may correspond to a sector. For example, sectors can be achieved using sector antennas, which provide a characteristic for covering an angular section around a remote unit or base station transceiver. In some disclosed embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

Mobile transceivers 100, 200 may communicate directly with each other, i.e., without involving any base station transceiver, which is also referred to as Device-to-Device (D2D) communication. An example of D2D is direct communication between transportation vehicles, also referred to as Vehicle-to-Vehicle communication (V2V). To do so radio resources are used, e.g., frequency, time, code, and/or spatial resources, which may as well be used for wireless communication with a base station transceiver. The assignment of the radio resources may be controlled by the base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc.

For example, direct Cellular Vehicle-to-Anything (C-V2X), where V2X includes at least V2V, V2-Infrastructure (V2I), etc., transmission according to 3GPP Release 14 can be managed by infrastructure (so-called mode 3) or run in a User Equipment (UE) Autonomous mode (UEA), (so-called mode 4). In disclosed embodiments the two or more mobile transceivers 100, 200 as indicated by FIG. 1 may be registered in the same mobile communication system 300. In other disclosed embodiments one or more of the two or more mobile transceivers 100, 200 may be registered in different mobile communication systems 300. The different mobile communication systems 300 may use the same access technology but different operators or they may use different access technologies as outlined above.

Disclosed embodiments may, for example, allow management of sidelink resources. The so-called sidelink is here used to refer to the direct link between two mobile transceivers 100, 200, e.g., PC5 in line with the 3GPP 5G terminology, which, however, does not preclude disclosed embodiments from being applied to or used in none-3GPP systems as well. Disclosed embodiments allow adapting the physical data channel configuration of a sidelink, for example, dynamically as part of a scheduling procedure. Here and in the following the act of scheduling may involve assigning resources for data transmission and reception in a D2D scenario. These resources are available on a physical data channel and information on which resources are used for transmission or reception is exchanged between the mobile transceivers 100, 200 on a physical control channel, to be able to quickly assign these resources. The assignment role is assumed by the first mobile transceiver 100 in disclosed embodiments by determining and providing the information on the physical data channel configuration to the second mobile transceiver 200 as also indicated by the arrows in FIG. 1. The physical control channel is preconfigured, e.g., in terms of the specification of a mobile communication system 300, e.g., a sidelink control channel, and channel estimation is carried out on both ends for efficient communication.

Static physical sidelink configurations might be suboptimal depending on the application, e.g., for best performance of connected automotive services. Modern or future connected automotive services may require prediction of quality of service (QoS) to optimize their performance according to available QoS key performance indicators (KPIs) such as throughput, latency and communication reliability. However, to allow for the development of agile adaptation of quality of application according to available or predicted QoS, it is crucial to design an agile scheduling scheme, to fulfill application requirements on QoS. Disclosed embodiments may add or introduce a physical layer configuration component to the scheduling process, which may be applied alternatively or in addition to opportunistic or deterministic scheduling, so to enable fulfillment of QoS requirements and their prediction.

In disclosed embodiments the physical layer data channel configuration may comprise one or more elements of the group of a time division duplex scheme, a frequency division duplex scheme, a code division duplex scheme, a spatial division duplex scheme, and an orthogonal frequency division multiplexing scheme. The physical layer data channel configuration may comprise at least an orthogonal frequency division multiplexing component. For example, the physical layer data channel configuration may comprise information on a subcarrier bandwidth configuration for the orthogonal frequency division multiplexing component. Such a configuration may involve the indication or configuration of further parameters, for example, symbol duration, cyclic prefix duration, time transmission interval (TTI) length, subcarrier spacing, etc. The physical layer data channel configuration may comprise information on a numerology defined for the mobile communication system 300.

For example, 3GPP defined in their technical specification TS 38.211 V15.1.0 in table 4.2.1 supported transmission numerologies. Multiple OFDM numerologies are supported as given by Table 4.2-1 of TS 38.211. As can be seen, different options for the subcarrier bandwidth are available based on parameter $\mu$. As the further sections in the same TS indicate $\mu$ also determines multiple further physical layer parameters, such as the number of OFDM symbols per slot, the number of slots per frame and subframe for normal cyclic prefix and alternatively for extended cyclic prefix.

Disclosed embodiments may provide a concept for sidelink resource management with an agile scheduling scheme for 5G-V2X (5th Generation Vehicle-to-Everything) communications. For example, the control modules 14, 24 may also comprise or constitute schedulers. They may assign physical layer configurations, e.g., in terms of numerologies, as part of a scheduling decision. In disclosed embodiments such an adaptive scheduler may take one or more of the following inputs:

QoS requirements from the application,
feedback from the PHY layer (physical layer) which contains channel measurements (e.g., radio channel estimates), and
environment model of static and mobile sidelink users across the route of the considered communication nodes.

In disclosed embodiments the control module 14 may be configured to determine the physical layer data channel configuration further based on one or more elements of the group of quality of service requirements of an application for which data is to be communicated with the second mobile transceiver, information on a predicted route of the first and/or second mobile transceivers, information on a predicted radio environment for the first and/or second mobile transceiver, and information on a predicted direct communication activity. In disclosed embodiments, information on a route of the mobile transceivers 100, 200 may be taken into account for determining the physical data channel configuration. For example, in a platoon of transportation vehicles comprising exemplary embodiments of mobile transceivers 100, 200, the route of the platoon may be known. As a consequence future locations of the transportation vehicles in the platoon can be predicted from information available from transportation vehicles, which have previously traveled the same route, for example, a short time ago, at the same time of day, at the same day of week, etc. In some disclosed embodiments such information may be made available to the control module 14 of the first mobile transceiver to be considered in the determination of the physical data channel configuration. In exemplary embodiments such information may be propagated within a platoon or among transportation vehicles in a multi hop manner. In other exemplary embodiments such information may be provided by the network, e.g., by gathering such data and/or its history at a server.

In some exemplary embodiments the scheduler implemented at the control module 14 may provide the following output:

frequency resources over the time axis for own PHY, and
a profile of numerologies for the modulation in the PHY.

For example, the numerologies are based on the description of 3GPP release 15 of 5G technology on the physical layer, e.g., TS 38.211 as cited above. In disclosed embodiments an adaptive scheduler at the control module 14 may receive the application requirements on QoS and predictive QoS with a prediction time horizon. The scheduler may then allocate current time and frequency resources for the current sidelink communications. It may also pre-allocate the needed resources to fulfill the applications requirements on QoS within the future time horizon. In disclosed embodiments the information on the physical data channel configuration may comprise information on frequency and time resources to be used for the data communication.

The resource allocation may be performed in cooperation with schedulers of other user equipment (UEs, mobile transceivers), which use the sidelink communications in some disclosed embodiments. For example, the allocation of resources may depend on the following inputs:
QoS requirements,
available numerologies for 5G communications for frequency division multiple access (FDMA) modulation in the PHY layer, and
the channel characteristics such as channel state information and end-to-end communication delay on the physical layer between the UEs (mobile transceivers 100, 200).

The UE managing the resources for sidelink communications (first mobile transceiver 100) may "agree" with the other UEs (second mobile transceiver 200) about the PHY configuration and resources usage. For that purpose, control signals have to be exchanged on the sidelink between the UEs to synchronize PHY and MAC (medium access control, layer 2) configurations, e.g., the used numerologies over time and assigned transmission time slots if TDD mode is used. All of this information may be communicated between the mobile transceivers 100, 200 using a physical control channel, which may be preconfigured, e.g., specified by a system standard for this purpose. For example, the control module 14 may be configured to receive information on the predetermined control channel configuration from a base station transceiver or a mobile transceiver of the mobile communication system 300. For example, the physical control channel may be predefined in terms of the 3GPP PC5 interface.

Disclosed embodiments may enable an introduction of a control channel to coordinate the resources allocation on the relevant UEs and to optimize the usage of the PHY layer configurations (numerologies) on the UEs to maximize the fulfillment of the applications requirements on QoS. In an exemplary embodiment the control channel may be used to signal a data channel configuration from the first mobile transceiver 100 to the second mobile transceiver 200, e.g., in terms of the above determined parameter μ together with a corresponding duplex indication (e.g., equally split Time slots in TDD) and a validation time, which is based on predicted future radio environment. The first transceiver 100 may then schedule another configuration subsequently, e.g., another μ, another duplex indication with another validation time, and so on.

Figure 2:
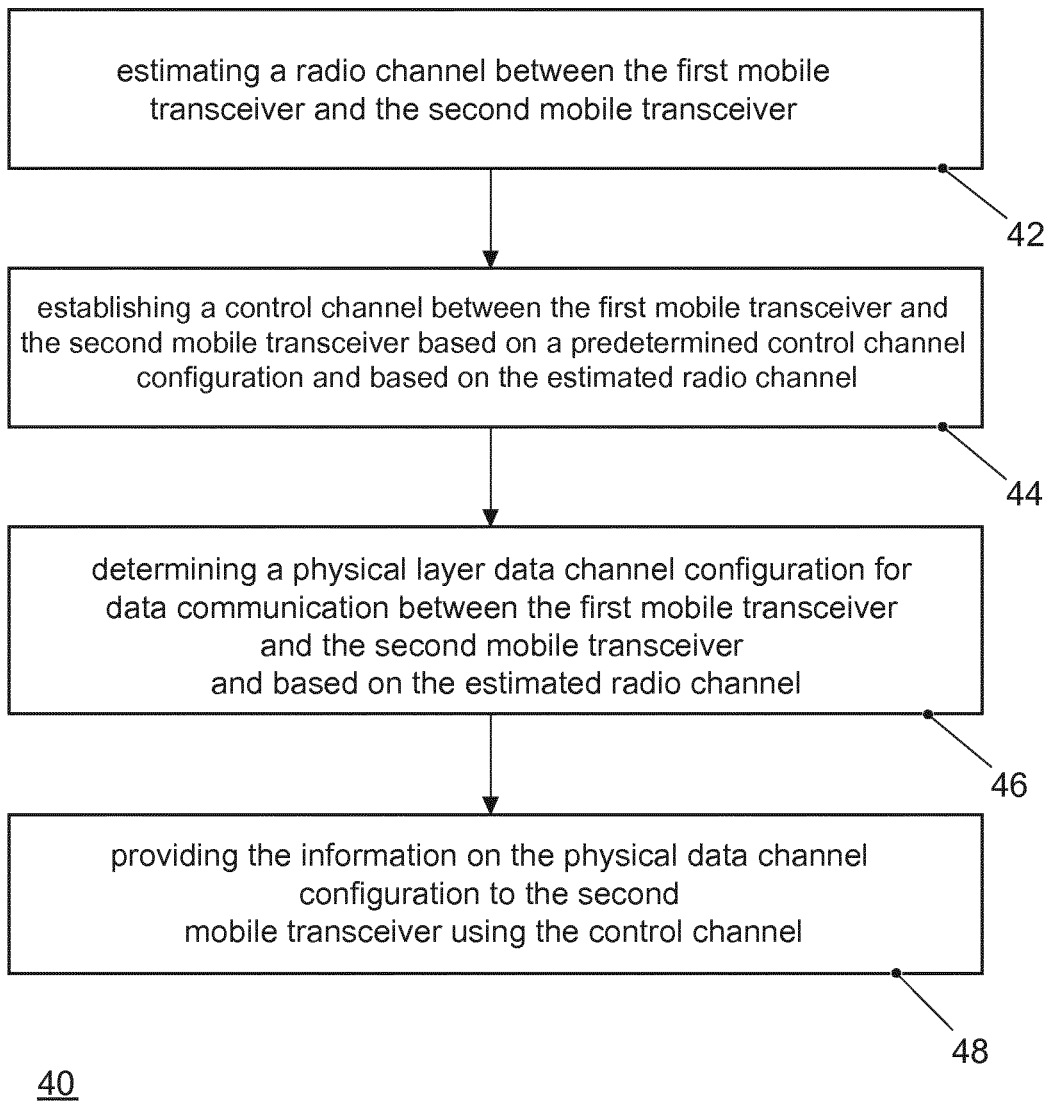
FIG. 2 shows a block diagram of a flow chart of an exemplary embodiment of a method for a first mobile transceiver.

FIG. 2 shows a block diagram of a flow chart of an exemplary embodiment of a method 40 for a first mobile transceiver 100 of a mobile communication system 300. The method 40 comprises estimating 42 a radio channel between the first mobile transceiver 100 and the second mobile transceiver 200, and establishing 44 a control channel between the first mobile transceiver 100 and the second mobile transceiver 200 based on a predetermined control channel configuration and based on the estimated radio channel. The method further comprises determining 46 a physical layer data channel configuration for data communication between the first mobile transceiver 100 and the second mobile transceiver 200 and based on the estimated radio channel. The method further comprises providing 48 the information on the physical data channel configuration to the second mobile transceiver 200 using the control channel.

Figure 3:
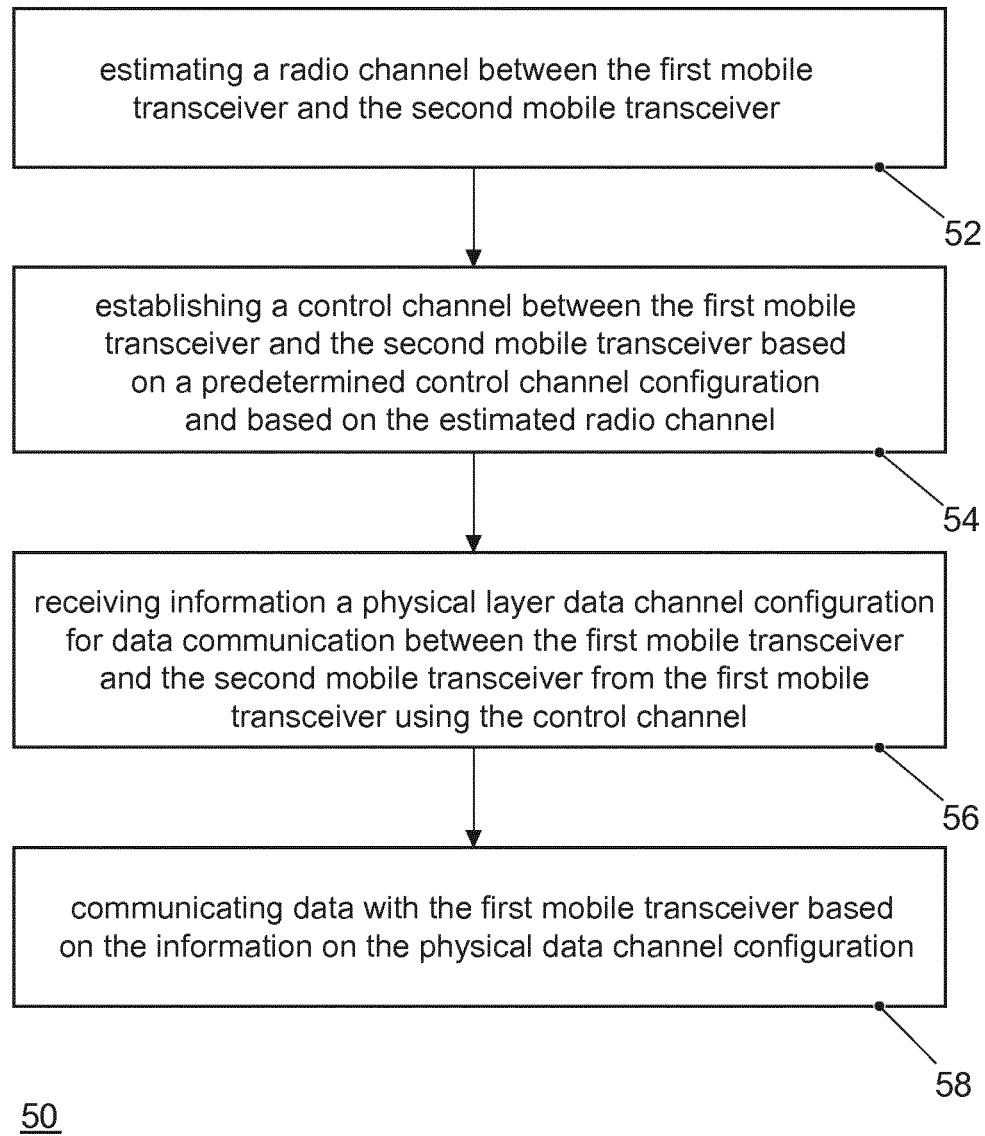
FIG. 3 shows a block diagram of a flow chart of an exemplary embodiment of a method for a second mobile transceiver.

FIG. 3 shows a block diagram of a flow chart of an exemplary embodiment of a method 50 for a second mobile transceiver 200 a mobile communication system 300. The method 50 comprises estimating 52 a radio channel between the first mobile transceiver 100 and the second mobile transceiver 200, and establishing 54 a control channel between the first mobile transceiver 100 and the second mobile transceiver 200 based on a predetermined control channel configuration and based on the estimated radio channel. The method further comprises receiving 56 information a physical layer data channel configuration for data communication between the first mobile transceiver 100 and the second mobile transceiver 200 from the first mobile transceiver 100 using the control channel. The method 50 further comprises communicating 58 data with the first mobile transceiver 100 based on the information on the physical data channel configuration.

As already mentioned, in disclosed embodiments the respective methods may be implemented as computer programs or codes, which can be executed on a respective hardware. Hence, another disclosed embodiment is a computer program having a program code for performing at least one of the above methods, when the computer program is executed on a computer, a processor, or a programmable hardware component. A further disclosed embodiment is a computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the methods described herein or (field) programmable logic arrays ((F)PLAs) or (field) programmable gate arrays ((F)PGAs), programmed to perform the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed to furthering the art, and are to be construed as being without limitation to such specifically recited examples and conditions. Moreover, all statements herein reciting principles and exemplary embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate disclosed embodiment. While each claim may stand on its own as a separate disclosed embodiment, it is to be noted that—although a dependent claim may refer in the claims to a specific combination with one or more other claims—other exemplary embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS 10 apparatus for first mobile transceiver
12 one or more interfaces
14 control module
20 apparatus for second mobile transceiver
22 one or more interfaces
24 control module
40 method for first mobile transceiver
42 estimating radio channel
44 establishing physical control channel
46 determining physical data channel configuration
48 providing information on physical data channel configuration
50 method for second mobile transceiver
52 estimating radio channel
54 establishing physical control channel
56 receiving information on physical data channel configuration
58 communicating data
100 first mobile transceiver
200 second mobile transceiver
300 mobile communication system

The invention claimed is:

1. An apparatus for a first mobile transceiver of a mobile communication system, the apparatus comprising:
one or more interfaces configured to communicate with a second mobile transceiver of the mobile communication system; and
a control module configured to control the one or more interfaces, wherein the control module is further configured to:
estimate a radio channel between the first mobile transceiver and the second mobile transceiver,
establish a control channel between the first mobile transceiver and the second mobile transceiver based on both a predetermined control channel configuration and the estimated radio channel,
determine a physical layer data channel configuration for direct wireless data communication between the first mobile transceiver and the second mobile transceiver based on the estimated radio channel, and
provide information indicating the physical layer data channel configuration to the second mobile transceiver using the established control channel between the first mobile transceiver and the second mobile transceiver to adapt the physical layer data channel configuration for an upcoming wireless direct communication between the first mobile transceiver and the second mobile transceiver,
wherein the adaptation provides an adaptive physical layer data channel configuration between the first and second mobile transceivers that is adaptable based on predicted application quality of service requirements for quality of service for the upcoming wireless direct communication between the first and second mobile transceivers, and
wherein the predicted quality of service requirements include at least one of throughput, latency and communication reliability for the wireless direct communication between the first and second mobile transceivers.

2. The apparatus of claim 1, wherein the physical layer data channel configuration includes at least one of a time division duplex scheme, a frequency division duplex scheme, a code division duplex scheme, a spatial division duplex scheme, and an orthogonal frequency division multiplexing scheme.

3. The apparatus of claim 1, wherein the physical layer data channel configuration comprises at least an orthogonal frequency division multiplexing component.

4. The apparatus of claim 3, wherein the physical layer data channel configuration comprises information indicating a subcarrier bandwidth configuration for the orthogonal frequency division multiplexing component.

5. The apparatus of claim 1, wherein the physical layer data channel configuration comprises information indicating a numerology defined for the mobile communication system.

6. The apparatus of claim 1, wherein the control module determines the physical layer data channel configuration further based on at least one of:
quality of service requirements of an application for which data is to be communicated with the second mobile transceiver, information indicating a predicted route of the first or second mobile transceiver, information indicating a predicted radio environment for the first or second mobile transceiver, and information indicating a predicted direct communication activity.

7. The apparatus of claim 1, wherein the information indicating the physical data channel configuration comprises information indicating frequency and time resources to be used for the data communication.

8. The apparatus of claim 1, wherein the control module receives information indicating the predetermined control channel configuration from a base station transceiver or a mobile transceiver of the mobile communication system.

9. An apparatus for use in a mobile communication system, the apparatus comprising:

one or more interfaces configured to communicate with a first mobile transceiver of the mobile communication system by a second mobile transceiver; and a control module of the second mobile transceiver configured to control the one or more interfaces, wherein the control module is further configured to:

estimate a radio channel between the first mobile transceiver and the second mobile transceiver, establish a control channel between the first mobile transceiver and the second mobile transceiver based on both a predetermined control channel configuration and the estimated radio channel, receive information indicating a physical layer data channel configuration for data communication between the first mobile transceiver and the second mobile transceiver from the first mobile transceiver using the established control channel, and communicate data with the first mobile transceiver based on the information indicating the physical layer data channel configuration using the established control channel between the first mobile transceiver and the second mobile transceiver to adapt the physical layer data channel configuration for an upcoming wireless direct communication between the first mobile transceiver and the second mobile transceiver, wherein the adaptation provides an adaptive physical layer data channel configuration between the first and second mobile transceivers that is adaptable based on predicted application quality of service requirements for quality of service for the upcoming wireless direct communication between the first and second mobile transceivers, wherein the predicted quality of service requirements include at least one of throughput, latency and communication reliability for the wireless direct communication between the first and second mobile transceivers.

10. The apparatus of claim 9, wherein the physical layer data channel configuration comprises at least an orthogonal frequency division multiplexing component.

11. The apparatus of claim 10, wherein the physical layer data channel configuration comprises information indicating a subcarrier bandwidth configuration for the orthogonal frequency division multiplexing component.

12. The apparatus of claim 9, wherein the information indicating the physical data channel configuration comprises information indicating frequency and time resources to be used for the data communication.

13. A method for a first mobile transceiver of a mobile communication system, the method comprising:

estimating a radio channel between the first mobile transceiver and the second mobile transceiver;

establishing a control channel between the first mobile transceiver and the second mobile transceiver based on both a predetermined control channel configuration and the estimated radio channel;

determining a physical layer data channel configuration for data communication between the first mobile transceiver and the second mobile transceiver based on the estimated radio channel; and providing information indicating the physical data channel configuration to the second mobile transceiver using the established control channel between the first mobile transceiver and the second mobile transceiver to adapt the physical layer data channel configuration for an upcoming wireless direct communication between the first mobile transceiver and the second mobile transceiver, wherein the adaptation provides an adaptive physical layer data channel configuration between the first and second mobile transceivers that is adaptable based on predicted application quality of service requirements for quality of service for the upcoming wireless direct communication between the first and second mobile transceivers, and wherein the predicted quality of service requirements include at least one of throughput, latency and communication reliability for the wireless direct communication between the first and second mobile transceivers.

14. A method for communication in a mobile communication system, the method comprising:

estimating a radio channel between a first mobile transceiver and the second mobile transceiver by a second mobile transceiver;

establishing a control channel between the first mobile transceiver and the second mobile transceiver based on both a predetermined control channel configuration and the estimated radio channel;

receiving information indicating a physical layer data channel configuration for data communication between the first mobile transceiver and the second mobile transceiver from the first mobile transceiver using the established control channel; and communicating data with the first mobile transceiver based on the information indicating the physical layer data channel configuration using the established control channel between the first mobile transceiver and the second mobile transceiver to adapt the physical layer data channel configuration for an upcoming wireless direct communication between the first mobile transceiver and the second mobile transceiver, wherein the adaptation provides an adaptive physical layer data channel configuration between the first and second mobile transceivers that is adaptable based on predicted application quality of service requirements for quality of service for the upcoming wireless direct communication between the first and second mobile transceivers, and wherein the predicted quality of service requirements include at least one of throughput, latency and communication reliability for the wireless direct communication between the first and second mobile transceivers.

15. A non-transitory computer readable medium including a computer program having a program code for performing a method for a first mobile transceiver of a mobile communication system, when the computer program is executed on a computer, a processor, or a programmable hardware component, the method comprising:

estimating a radio channel between the first mobile transceiver and the second mobile transceiver;

establishing a control channel between the first mobile transceiver and the second mobile transceiver based on both a predetermined control channel configuration and the estimated radio channel;

determining a physical layer data channel configuration for data communication between the first mobile transceiver and the second mobile transceiver and based on the estimated radio channel; and providing information indicating the physical layer data channel configuration to the second mobile transceiver using the established control channel between the first mobile transceiver and the second mobile transceiver to adapt the physical layer data channel configuration for an upcoming wireless direct communication between the first mobile transceiver and the second mobile transceiver, wherein the adaptation provides an adaptive physical layer data channel configuration between the first and second mobile transceivers that is adaptable based on predicted application quality of service requirements for quality of service for the upcoming wireless direct communication between the first and second mobile transceivers, and wherein the predicted quality of service requirements include at least one of throughput, latency and communication reliability for the wireless direct communication between the first and second mobile transceivers.

16. A non-transitory computer readable medium including a computer program having a program code for performing a method for communication in a mobile communication system, when the computer program is executed on a computer, a processor, or a programmable hardware component, the method comprising:

estimating a radio channel between a first mobile transceiver and the second mobile transceiver by a second mobile transceiver;

establishing a control channel between the first mobile transceiver and the second mobile transceiver based on both a predetermined control channel configuration and the estimated radio channel;

receiving information indicating a physical layer data channel configuration for data communication between the first mobile transceiver and the second mobile transceiver from the first mobile transceiver using the established control channel; and communicating data with the first mobile transceiver based on the information indicating the physical data channel configuration using the established control channel between the first mobile transceiver and the second mobile transceiver to adapt the physical layer data channel configuration for an upcoming wireless direct communication between the first mobile transceiver and the second mobile transceiver, wherein the adaptation provides an adaptive physical layer data channel configuration between the first and second mobile transceivers that is adaptable based on predicted application quality of service requirements for quality of service for the upcoming wireless direct communication between the first and second mobile transceivers, wherein the predicted quality of service requirements include at least one of throughput, latency and communication reliability for the wireless direct communication between the first and second mobile transceivers.

17. The apparatus of claim 9, wherein the control module determines the physical layer data channel configuration further based on at least one of:

quality of service requirements of an application for which data is to be communicated with the second mobile transceiver, information indicating a predicted route of the first or second mobile transceiver, information indicating a predicted radio environment for the first or second mobile transceiver, and information indicating a predicted direct communication activity.

18. The method of claim 13, wherein the physical layer data channel configuration is further determined based on at least one of:

quality of service requirements of an application for which data is to be communicated with the second mobile transceiver, information indicating a predicted route of the first or second mobile transceiver, information indicating a predicted radio environment for the first or second mobile transceiver, and information indicating a predicted direct communication activity.

19. The method of claim 14, wherein the physical layer data channel configuration is further determined based on at least one of:

quality of service requirements of an application for which data is to be communicated with the second mobile transceiver, information indicating a predicted route of the first or second mobile transceiver, information indicating a predicted radio environment for the first or second mobile transceiver, and information indicating a predicted direct communication activity.

20. The non-transitory computer readable medium of claim 15, wherein the physical layer data channel configuration is further determined based on at least one of:

quality of service requirements of an application for which data is to be communicated with the second mobile transceiver, information indicating a predicted route of the first or second mobile transceiver, information indicating a predicted radio environment for the first or second mobile transceiver, and information indicating a predicted direct communication activity.

21. The non-transitory computer readable medium of claim 16, wherein the physical layer data channel configuration is further determined based on at least one of:

quality of service requirements of an application for which data is to be communicated with the second mobile transceiver, information indicating a predicted route of the first or second mobile transceiver, information indicating a predicted radio environment for the first or second mobile transceiver, and information indicating a predicted direct communication activity.

* * * * *